T. C. & F. M. HOCKING.
FOLDABLE COVER OR AWNING.
APPLICATION FILED JULY 24, 1914.
1,150,764.
Patented Aug. 17, 1915.
2 SHEETS—SHEET 1.
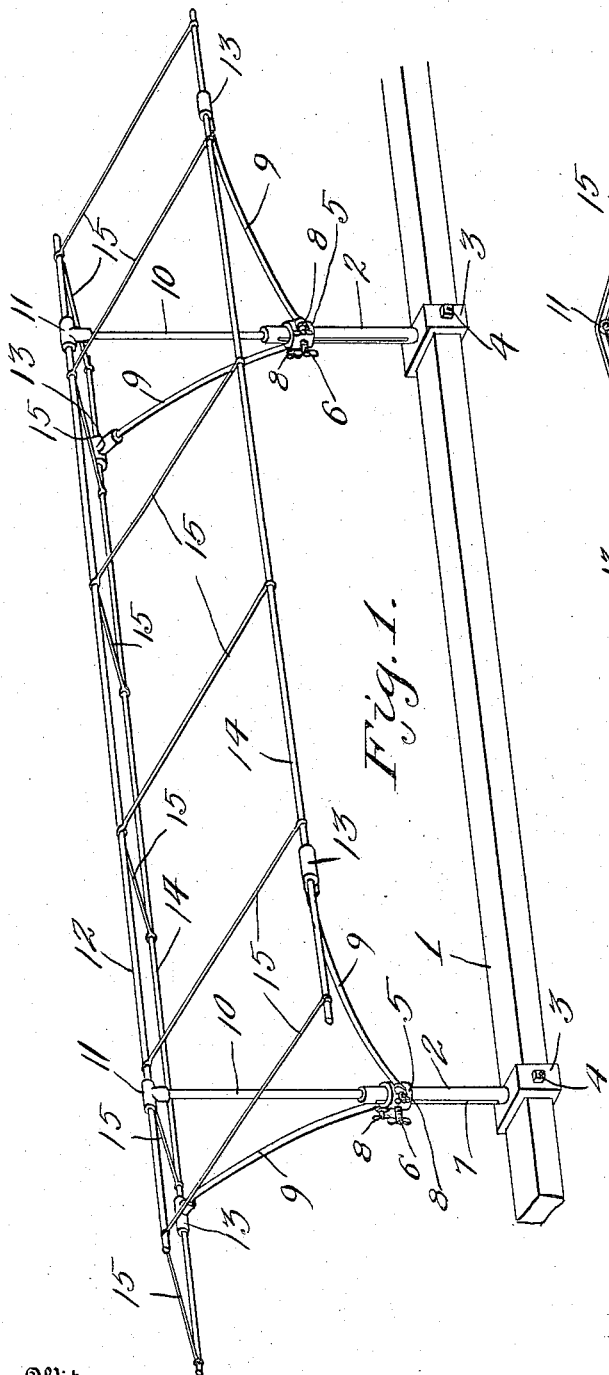
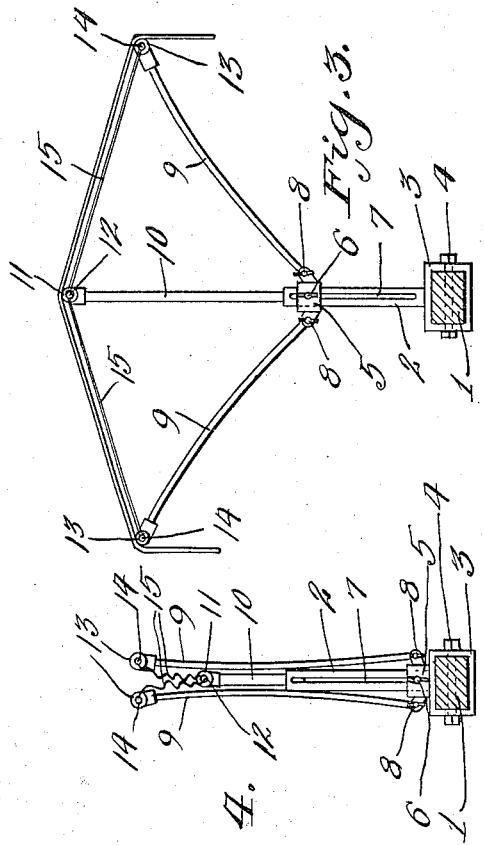
Witnesses
Philip Terrell
Francis H. Oswell
Inventors
T. C. Hocking
and F. M. Hocking
By D. Swift H.
their Attorneys
COLUMBIA PLANOGRAPH CO., WASHINGTON, D. C.

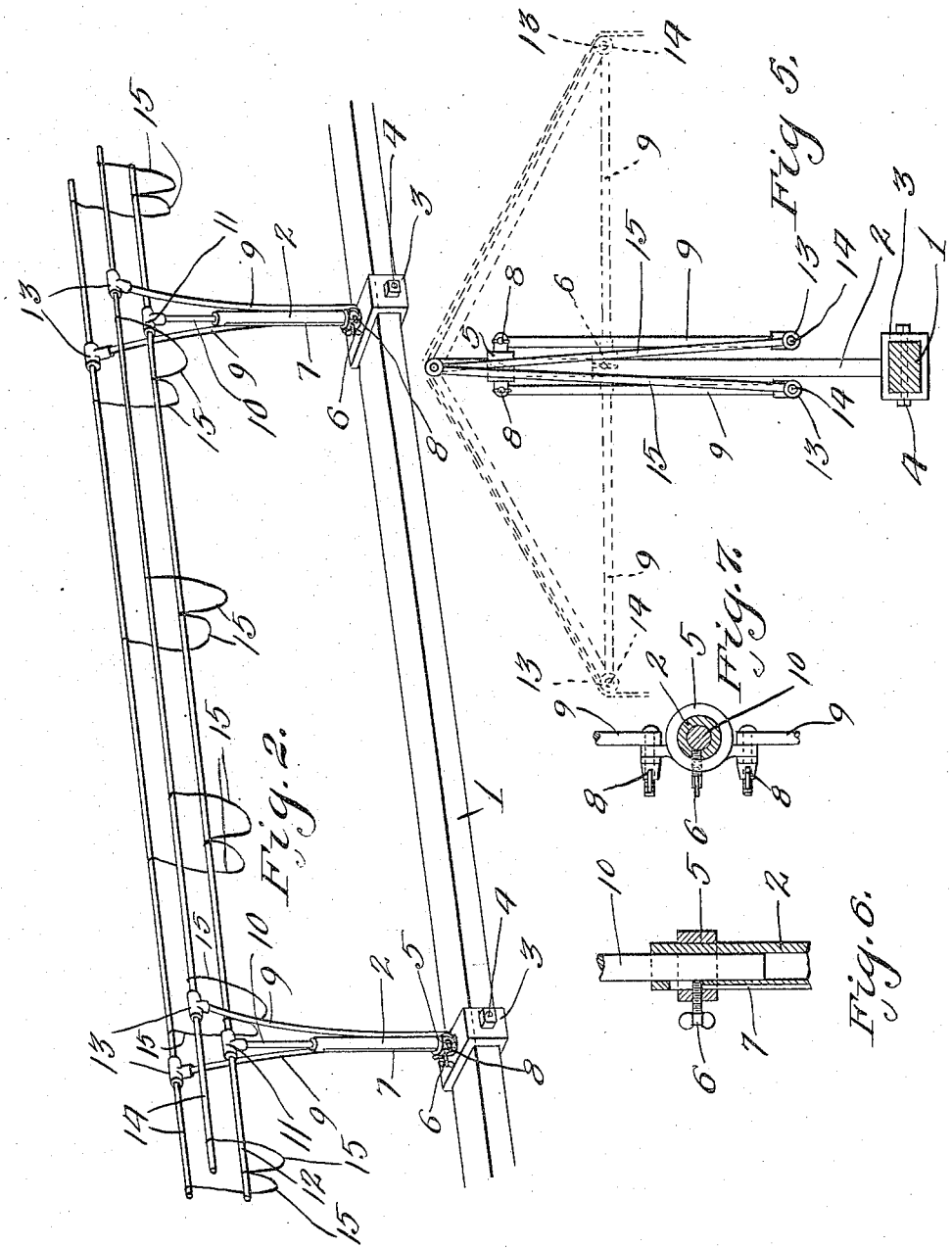

UNITED STATES PATENT OFFICE.

TOLBERT C. HOCKING AND FRANCIS M. HOCKING, OF BONE GAP, ILLINOIS.

FOLDABLE COVER OR AWNING.

1,150,764.  Specification of Letters Patent.  Patented Aug. 17, 1915.

Application filed July 24, 1914. Serial No. 852,856.

*To all whom it may concern:*

Be it known that we, TOLBERT C. HOCKING and FRANCIS M. HOCKING, citizens of the United States, residing at Bone Gap, in the county of Edwards and State of Illinois, have invented a new and useful Foldable Cover or Awning; and we do hereby declare the following to be a full, clear, and exact description of the invention such as will enable others skilled in the art to which it appertains to make and use the same.

This invention relates to the art of awnings and coverings, and particularly to an awning or covering particularly adapted for use in connection with double horse teams of any suitable farming machinery, such as gang plows, wagons, corn binders and the like.

As an object of the invention it is the aim to provide a device of this nature having certain improved features of construction.

One of the features of the construction is the provision of an awning or covering mounted upon a tongue or pole, in such wise that the same may be collapsed or folded, when not needed, but when extended, the opposite sides of the awning are disposed over each animal on each side of the pole or tongue, so as to shade the animal from the sun, especially when cultivating corn fields and the like.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of a portion of a tongue or pole showing the improved covering or awning mounted thereon. Fig. 2 is a similar view showing the awning or covering collapsed or folded. Fig. 3 is an end view of Fig. 1. Fig. 4 is an end view of Fig. 2. Fig. 5 is an end view of another form, showing another manner of collapsing the covering or awning. Figs. 6 and 7 are details.

Referring more especially to the drawings, 1 designates the tongue or pole and 2 are tubular standards having sleeves 3, which receive the pole or tongue being riveted or bolted at 4, as shown. Slidable upon the outer portion of the tubular standard are sleeves 5, the thumb screws 6 of which engage vertical grooves 7 of said standards, so as to prevent twisting of the sleeves when adjusted. Pivoted at 8 to opposite sides of each sleeve are laterally and upwardly extending arms (which are curved) 9, there being thumb nuts upon the pivot bolt 8 to hold the said arms in adjusted position. Telescoping the tubular standards are rods 10, which when raised to their highest positions are held in such positions by the thumb screws 6 which extend entirely through the tubular standards, that is, at the upper portion of said groove of the standards. The upper ends of the rods 10 are provided with sleeves 11, through which the rods 12 extend, being secured in said sleeves 11, in any suitable manner, such as by friction. The outer ends of the arms 9 terminate in sleeves 13, in which the rods 14 are received and secured in any suitable manner. The rods 12 and 14 are connected by flexible ropes or cables 15, extending downwardly and outwardly. These ropes or cables are arranged at various intervals. In collapsing the covering or awning the sleeves 5 are moved downwardly upon the tubular standards, after loosening the thumb or set screws, 6, the arms 9 moving upon their pivots, then the rods 10 are allowed to telescope the tubular standards, as shown clearly in Figs. 2 and 4. In Fig. 5, however, the ropes or cables are dispensed with, and in their stead rods 18 are substituted. In Fig. 5 only the sleeves 5 are lowered telescopically upon the tubular standards, thereby collapsing the arms 9 toward the standards.

The invention having been set forth, what is claimed as new and useful is:—

1. In combination with a tongue or pole, a pair of tubular standards having sleeves at their lower ends to fit the tongue or pole and provided with vertical grooves upon their outer surfaces, each groove terminating at its upper end in an opening through the wall of the tubular rod, sleeves adjustable upon the tubular rod, thumb screws adapted to pass through the sleeve, and when the sleeves are in their uppermost positions extending through the openings of the upper end of said groove, vertical rods telescoping the tubular rods and held in their uppermost positions by said thumb screws, curved arms pivotally and adjustably connected to said sleeves and extending outwardly and upwardly, a longitudinal rod connecting the upper ends of the vertical rods, elongated rods connecting the outer ends of said arms, flexible connections between the elongated rod and the rod connected to the upper ends of the vertical rods, and an awning stretched upon said elongated rods and said connections.

2. In combination with a tongue or pole, a pair of tubular standards mounted upon the tongue or pole and provided with vertically extending elongated slots, sleeves mounted upon said tubular standard, vertical rods adjustably telescoping the tubular standards, a horizontal rod connecting the upper ends of said vertical rod, two pairs of rods, the rods of each pair having their inner adjacent ends pivotally connected to the opposite sides of one of the sleeves and extending laterally and slightly upwardly, horizontal rods connecting the outer upper ends of the rods of one pair to the outer ends of the rods of the other pair, flexible connections connecting the outer horizontal rods and the horizontal rod which connect the upper ends of the vertical rods, and screws carried by the sleeves penetrating the vertical slots and engaging the vertical rods for holding the sleeves and the vertical rods in adjusted positions.

In testimony whereof we have signed our names to this specification in the presence of two subscribing witnesses.

TOLBERT C. HOCKING.
FRANCIS M. HOCKING.

Witnesses:
GILES HOCKING,
G. W. THOMAS.

Copies of this patent may be obtained for five cents each, by addressing the "Commissioner of Patents, Washington, D. C."